United States Patent [19]

Edwards

[11] 3,965,075

[45] June 22, 1976

[54] CATALYZED PROCESS FOR IMIDE-ALCOHOL CONDENSATION

[75] Inventor: James W. Edwards, St. Louis, Mo.

[73] Assignee: Monsanto Company

[22] Filed: July 22, 1974

[21] Appl. No.: 490,438

[52] U.S. Cl. .............................. 260/78 L; 260/75 M; 260/239 R; 260/453 R; 260/857 PG
[51] Int. Cl.$^2$ .................. C08G 69/20; C08G 69/44
[58] Field of Search .......... 260/78 L, 857 PG, 75 M

[56] References Cited
UNITED STATES PATENTS

| | | | |
|---|---|---|---|
| 2,682,526 | 6/1954 | Flory | 260/75 |
| 3,308,099 | 3/1967 | Mermoud et al. | 260/78 L |
| 3,366,608 | 1/1968 | Lincoln et al. | 260/78 L |
| 3,394,156 | 7/1968 | Kornicker et al. | 260/78 L X |
| 3,636,135 | 1/1972 | Garforth | 260/857 PG |
| 3,660,356 | 5/1972 | Radlmann et al. | 260/857 PG X |
| 3,862,262 | 1/1975 | Hendrick et al. | 260/857 PG X |

*Primary Examiner*—Lucille M. Phynes

[57] ABSTRACT

A catalyzed process for the preparation of monomeric and/or polymeric compounds such as esters, polyesters, ester-amides, and polyester-polyamides which result from the reaction of an imide and an alcohol in the presence of an amine or Group IVA, IB, IVB, VB, VIB, and VIII organometal compound, imide-alcohol condensation catalyst.

10 Claims, No Drawings

CATALYZED PROCESS FOR IMIDE-ALCOHOL CONDENSATION

BACKGROUND OF THE INVENTION

The invention relates to catalytic process for the condensation of imides and alcohols. In another aspect the invention relates to a catalytic process for the preparation of monomeric and/or polymeric compounds such as esters, polyesters, ester-amide, and polyester-polyamides. Yet in another aspect, the invention relates to the catalyzed imide-alcohol condensation preparation of polymers and copolymers having a variety of molecular weights.

Condensation reactions for imides and alcohols have been taught; however, these known condensation processes are slow and require several hours before reaction completion is approached. Imide-alcohol condensation reactions which produce polymers of lower molecular weight proceed under moderate conditions, but it is much more difficult to prepare polymers of high molecular weight. In the preparation of polymers by imide-alcohol condensation reaction, only polymers of a moderate molecular weight could be achieved unless specific reactants such as polymers having a plurality of hydroxyl and/or amino radicals were used. The latter class of reactant is described in U.S. Pat. No. 2,682,526 to Flory, for the purpose of preparing polymers of high molecular weight by imide-alcohol condensation reactions. The described imide-alcohol condensation reactions were not catalyzed and required reaction periods of several hours and specific reactants in order to achieve high molecular weight products. In the absence of an imide alcohol condensation catalyst, the described process lacked sufficient reactive activity to utilize for example, alcohols or polymers having secondary hydroxyl radical.

It is an object of this invention to provide a rapid, organo metal or amine catalyzed process for the condensation of imides and alcohols resulting in the formation of monomeric and/or polymeric compounds such as esters, polyesters, ester-amides, and polyester-polyamides. Another object of this invention is to facilitate the preparation of such condensation products in instances where the preparation required forced and strenuous conditions by known means. Yet another object of this invention is to prepare copolymers of varying molecular weights under controlled conditions. Other objects and advantages will appear as the description proceeds.

SUMMARY OF THE INVENTION

If an imide-alcohol condensation process could be found which provided sufficient control of reaction conditions resulting in products of varying molecular weights it would represent a significant advance in the state of the art. The present invention pertains to the amine or organometal catalization of imide-alcohol condensation reactions wherein the alcohol has one or more hydroxyl groups attached to an aliphatic carbon. The invention pertains further to a catalyzed imide-alcohol condensation reaction for the preparation of monomeric or polymeric compounds such as esters, polyesters, polyester amides, and polyester polyamides.

DESCRIPTION OF THE PREFERRED EMBODIMENTS

It has now been found that the object of the present invention may be accomplished by catalyzing imide-alcohol condensation reaction with a Group IVA organometal compound, imide-alcohol condensation catalyst. Generally, organometal compounds of Groups IVA, IB, IVB, VB, VIB and VIII are suitable catalysts for the imide-alcohol condensation according to the invention. Suitable catalyst can be formed from a number of organo-metallic compounds of these metals such as metal alkyls, metal phenols, metal amide, alkoxides, glycoxides and the like. Examples include stannous octoate, dibutyl tin dilaurate, Lead linoresinate, naphthenate, oleate, 2-ethylhexonate, Ferric 2-ethylhexanoate, chloride, acetylacetonate, Dibutyltin sulphide, acetylacetonate, dibutoxide, di-2-ethylhexanoate, Stannous oleate, 2-ethylhexanoate, chloride, Cobalt 2-ethylhexanoate, naphthenate, Vanadium acetylacetonate, Vanadyl acetylacetonate, Tetraisopropyl titanate, Tetra-2-ethylhexyl titanate, Titanium acetylacetonate, Triethylenediamine, n-ethylethylenimine, Tetramethylguanidine, N-ethylmorpholine, Triethylamine, Copper acetylacetonate, naphthenate, Chromium acetylacetonate, Tributylphosphine. Catalyst concentrations can range from a fraction of one mole percent to 15 or 20 or more mole percent of the alcohol segment. The term "alcohol segment" as defined for the purposes of this invention means compounds having at least one hydroxyl radical attached to an aliphatic carbon. The polymers which result from the catalyzed imide alcohol condensation reaction according to the invention can be utilized as prepolymers, for example, the polymerization of lactam in the preparation of terpolymers.

The alcohol segments according to the invention include simple alcohols and/or polyols, arising from monomeric or polymeric compounds where the hydroxyl radical is attached to the compound through an aliphatic carbon. The alcohol segments can have one or more hydroxyl radicals attached through the aliphatic carbon. Typical alcohols which are operable according to the invention are monohydric aliphatic alcohols, e.g. methanol, ethanol, 1-propanol, 2-propanol, 1-butanol, tertiary butanol 2-ethylhexanol, 1-dodecanol, 1-octadecanol; unsaturated alcohols, e.g. allyl alcohol and methallyl alcohol, halogenated alcohols, e.g. ethylene chlorohydrin; the nitro alcohols, e.g. 2-nitrobutanol-1; ether-alcohols, e.g. ethylene glycol monomethyl ether, and diethylene glycol monoethyl ether; cycloalkanols, e.g. cyclohexanol, aralkyl alcohols, e.g. benzyl alcohol, tertiary-amino alcohols, e.g. triethanolamine, the cycloalcohols, e.g. beta-cyanoethanol; the polyhydric alcohols, e.g. ethylene glycol, the polyethylene glycols, polymeric alcohols which have been formed by oxidizing and then partially reducing isoolefin; conjugated diolefin copolymers, alkyl resins having terminal alcoholic hydroxyls, glycerol, pentaerythritol, cellulose, starch, glucose, sucrose, sorbitol, polyvinyl alcohol, and partial ethers and esters thereof; monoglycerides; diglycerides; triglycerides containing one or more alcoholic hydroxyl groups, e.g. castor oil and "blown" oils made from oils such as soya and linseed oils; methylol phenols, e.g. 2,6-dimethylol 4-alkyl-phenols and their condensation polymers, N-methylol compounds, e.g. N-methylolmalcimide and N,N'-dimethylolurea; and alcohols containing sulfone groups, e.g. those alcohols made from a glycol and divinyl sulfone.

Available commercial polyols which are suitable reactants according to the inventive process are produced by reacting, for example, propylene oxide or ethylene oxide with glycols, glycerol, pentaerythritol, glucose, amines, and the like. Included within the scope of the above class are a large number of suitable compounds ranging from the simple diols such as ethylene glycol to complex polymeric polyols such as poly (ε-caprolactone) diol. Other polyol compounds include alkylene glycols such as diethylene glycol, triethylene glycol, tetramethylene glycol, propylene glycol, dipropylene glycol, hexylene glycol, 1,2-propanediol, 1,3-propanediol, 1,3-hexanediol, 1,5-pentanediol, butylene glycol, 1,4-butanediol, dicyclopentadiene glycol, heptaethylene glycol, and isopropylidene bis (phenyleneoxypropanol-2); diols other than alkylene glycols such as hydroxyethyl acrylate and hydroxypropyl methacrylate; polyols having more than two hydroxy functions such as glycerol, pentaerythritol, 1,2-hexanetriol, and 1-trimethylol propane; polymeric polyols such as polyethylene glycol, polypropylene glycols, polyoxypropylene diols and triols, castor oils, polybutadiene glycols and polyester glycols. In addition to all the hydroxy compounds set forth above, the thio compounds analogous to the above compounds having sulfur atoms in place of oxygen are also included within the scope of the invention. A few examples include hydroxyethyl thioglycolate, ethylene glycol bis (thioglycolate), pentaerythritol, tetrakis(thioglycolate) and thiodiglycol.

If the polyol intermediate is a polymer, the molecular weight of the polyol can be any amount. Commercially available polyol compounds have molecular weights from 200 to 5000, but polymers with molecular weights outside that range can also be useful in the practice of the instant invention. If the polyol intermediate is a single molecule having two hydroxyl radicals such as ethylene glycol, a suitable polyol according to the invention would have a molecular weight of at least 62; however, simple methyl alcohol having a molecular weight of 32 is also a suitable reactant according to the invention.

Various imides will work according to the catalyzed imide alcohol condensation process of the invention; however, acyl lactams, acyl polylactams, and polyacyl lactams are the preferred imides and for the purpose of this disclosure will be referred to as acyl lactams. Typical polymers are produced according to the catalyzed imide alcohol condensation reaction wherein the polyacyl lactam constituent is reacted with a polyol constituent. In the formula set forth below for the polyacyl lactam useful herein, the R group can be any hydrocarbon group having the necessary number of available valences to bond itself to all of the acyl groups included in the compound. The hydrocarbon group can be of any size, but preferably contains a maximum of 8 to 10 carbon atoms. Examples of suitable R groups include phenylene, biphenylene, methylene, hexylene, polyoxyethylene, polyoxypropylene, and analogous hydrocarbons having more than two sites available for bonding to acyl groups. The A and A' groups can be carbonyl, thiocarbonyl, sulfuryl, phosphoryl. The Y group can represent any alkylene chain having from 3 to 14 or more carbon atoms, preferably from about 3 to about 10 carbon atoms. Preferred among the class of polyacyl lactams included within the scope of the formula given below are those where the A and A' are carbonyl groups. Particularly preferred are those compounds where A and A' are carbonyl, where R is either alkylene or phenylene, Y is a five membered alkylene group and the integer a is 1. Suitable polyacyl lactams which can comprise the imide segment of the imide alcohol condensation reaction are represented by the formula:

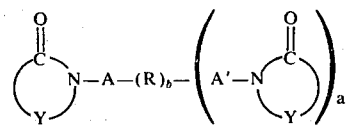

where A and A' are acyl groups selected from

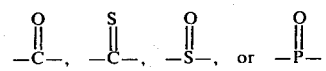

where Y is an alkylene group having at least about 3 carbon atoms, where R is a divalent or polyvalent group, where $a$ is an integer equal to at least 1, and $b$ is an integer. Examples include terephthaloyl bis-caprolactam, i.e.

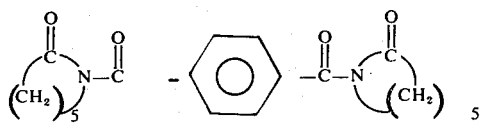

oxalyl bis caprolactam; isophthaloyl bis-caprolactam; adipoyl bis-caprolactam; malonyl bis-pyrrolidinone; succinoyl bis-pyrrolidinone; glutaroyl bis-piperidone; glutaconoyl bis-piperidone; 2-ethyl-2-phenyl-glutaroyl bis-valerolactam; 2,3-diethylsuccinoyl bis-caprolactam; pimeloyl bis-capryllactam; sebacyl bis-caprolactam, phthaloyl bis-piperidone; isophthaloyl bis-dodecanolactam; trimesoyl-tris-caprolactam; 1,2, 3,5-benzenetetracarbonyl-tetrakis-caprolactam; 1,2,3,4-napthalene-tetracarbonyl-tetrakis-piperidone and 1,4-cyclohexanedicarbonyl bis-caprolactam; 1,3-benzene disulfonyl caprolactam; 3-(sulfonyl caprolactam) benzoyl caprolactam; phosphoryl tris-caprolactam; benzene phosphoryl bis-caprolactam; and dithioterephthaloyl bis-caprolactam.

A typical catalyzed imide-alcohol condensation reaction according to the invention is represented by the schematic formulations:

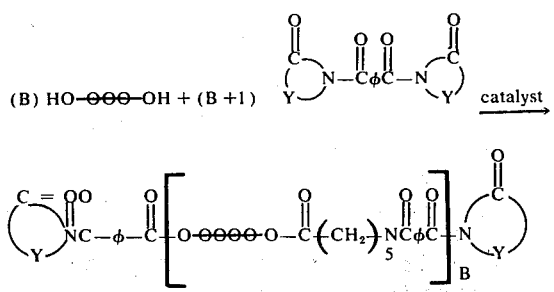

wherein Y is an alkylene group having at least about 3 carbon atoms, $\phi$ is an aromatic segment, B is an integer equal to one or more and the HO—OOO—OH represents, for example, a polyetherdiol.

The amount of acyl lactam useful for the preparation of the copolymers according to the invention depends upon the quantity of alcohol or polyol being used. For preferred polymerization, it is desirable that the acyl lactam be present in an amount from about 10 to about 200 mole percent of the alcohol or polyol. Preferred ratios of the two polymer forming materials, i.e. imide-alcohol, depend upon the end use to applications of the finished polymers. For end use applications requiring elastomeric properties such as elongation, the relative proportions of the two monomers can be arranged so that the polymerizable medium will contain 60 or 80 or 90 percent or more of the polyol compound. Polymers containing about equal quantities of both acyl lactam and polyol are preferred for a great many uses because of the advantageous combination of properties achieved by such polymers.

Other end product considerations can be made in selecting the reagents according to the catalyzed imide-alcohol condensation reaction such as selecting a polyacyl lactam with an aromatic hydrocarbon group between the acyl lactam groups as opposed to a long chain aliphatic group. The selection of the aromatic group will result in a more rigid product. Similarly the copolymers can be highly crosslinked through the use of polyols having more than two hydroxyl groups. With all the foregoing techniques available for modifying and adjusting the properties of the polymers produced by the invention, it can be appreciated that the polymers can be used in a number of end use applications. It is contemplated that the copolymers produced by this invention will be particularly useful in a number of textile and other applications. Textile applications for the copolymers include the use in the manufacture of nonwoven fabrics and high moisture regain fibers. The copolymers produced according to the inventive process can also be manufactured as foam articles. The copolymers can also be produced in the form of molding resins which can subsequently be molded by injection molding, extruding, thermoforming and other techniques to produce products of virtually any shape. The highly elastomeric copolymers can also be used in the manufacture of automobile tires and tire components. The polymers can be modified with fillers, fibers, pigments, dyes, stabilizers, plasticizers, flame retardants and other polymeric modifiers to alter their properties and thereby enlarge even further the scope of applicability. One such modification comprises reinforcing the polymers with fillers or fibers which have been treated with coupling agents capable of increasing the bonding of the fillers or fibers to the polymer molecules. A large number of organo-silane compounds have been found to be especially capable of performing this task of improving adhesion between polymer and filler or fiber. Examples of some suitable organosilane couplers for use with the polymers produced according to the invention include 3-aminopropyl triethoxysilane, glycidoxypropyl, trimethoxysilane and N-trimethoxysilylpropyl-N-a-amino-ethyl-amine. Preferred fillers and fibers include quartz, wollastonite, feldspar, calcined kaolin clay, glass fibers and other high performance fibers such as graphite, boron, steel and the like. The concentrations of fillers and fibers can vary from very small amounts such as 1 or 2 volume percent up to 70 or 80 percent by volume or more.

The organometal or amine catalyzed imide-alcohol condensation according to the invention utilize temperatures varying from about −20°C to about 230°C or more depending upon the particular ingredients being used. Preferred polymerization temperatures range from about 20° to about 180°C. Catalyzed imide-alcohol condensation process reaction periods vary depending upon the condensation temperatures and the specific ingredients used in the polymerization system. Total polymerization time can be as little as 0.5 seconds and can range preferably from a few seconds to a few minutes, for example from about 0.5 seconds up to about 1 to 2 hours or more. The periods of reaction can be extended to any duration up to several hours or more; however, the catalyzed imide-alcohol condensation reaction can generally be completed in a matter of two hours or less. It is preferable to use substantially anhydrous reagents and solvents in the catalyzed imide-alcohol condensation reaction. It is also preferable to use an inert atmosphere such as nitrogen in order to achieve an anhydrous atmosphere. The catalyzed imide-alcohol condensation reaction occurs under atmospheric pressure; however, various pressures can be utilized when higher temperatures will require liquification pressures for the reactants.

The following examples illustrate the use of an amine and Group IV organometal compounds as catalysts for the condensation of imide-alcohols according to the invention. These examples are presented for the purpose of demonstrating the invention and are not intended to independently define the entire inventive scope.

EXAMPLE I

In this example an imide terminated prepolymer is prepared and then reacted catalytically, using stannous octoate as catalyst, with a mixture of polymeric diols and triols to form an elastomer. Terminal hydroxyls of these polyols were mixed primary and secondary.

The following were weighed into a tared 4-necked flask:

| | | |
|---|---|---|
| Polymeg (polytetramethylene oxide glycol) | 293.7g | ≡ 300 meq. |
| BAIT (Isophthaloyl bis-caprolactam) | 108.3g | ≡ 600 meq. |
| Toluene | 810 ml | |

The mixture was heated with stirring to form an azeotrope with water. The toluene was distilled off. The BAIT and Polymeg were heated at 140°–145°C for 2 hours. In the final stages, heating was under vacuum to remove caprolactam (12.2 grams). In the presence of catalyst, little if any caprolactam splits out.

The elastomer is then prepared using

| | | |
|---|---|---|
| Polypropylene triol | 73.2g | ≡ 75 meq. |
| Polypropylene diol | 50.3g | ≡ 50 meq. |
| Prepolymer from above | 159.5g | ≡ 125 meq. |
| and stannous octoate | 0.62g | ≡ 3.0 meq. |

The diol and triol were heated together under vacuum at 100°–110°C till bubbling ceases to drive off water. Nitrogen gas is then admitted to the flask up to atmospheric pressure and the catalyst, stannous octoate, is added, the system closed and evacuated with heating (100°–110°C) and stirring for 10 minutes. The vacuum is again broken with nitrogen and the prepolymer added. The reaction mixture is then reheated under vacuum with stirring for 30 minutes. The contents are then poured into molds and placed in an oven to cure at 140°C for 24 hours. The resulting product had the following properties:

| | |
|---|---|
| Shore A hardness | 41 |
| Tensile, psi at failure | 395 lb/in$^2$ |
| elongation at failure | 525% |
| Tear strength | 69 lbs/in |
| Compression | 93.5 lb/in$^2$ at 25°C |

In the absence of the stannous octoate catalyst this reaction mixture did not set.

EXAMPLE II

This is an example of catalysis of an imide-alcohol polymer with primary terminated polyols using triethylene diamine as catalyst: The reactor was charged as follows:

| | |
|---|---|
| Polypropylene glycol | 303.9g ≡ 300 meq. |
| BAIT (isophthaloyl bis-caprolactam) | 109.0g ≡ 600 meq. |
| Toluene | 645 ml |
| Ethyl magnesium bromide 3M ether solution | 4.5 ml ≡ 13.5 meq. |
| Water | 4.5 ml |

The glycol, BAIT and 600 ml of toluene are combined in a flask and distilled to azeotrope water from the mixture, requiring distillation of about 125 ml of toluene. The ethyl magnesium bromide solution was mixed with 45 ml of toluene in a hypodermic syringe and then slowly added to the reaction vessel with stirring after which refluxing at 116°C was continued for 30 minutes. The reaction mixture was cooled to 90°C and 4.5 ml of water was added to destroy remaining catalyst. Toluene and water were then removed by distillation followed by vacuum topping at 144°C to yield the finished prepolymer.

After cooling the polymer to 60°C the following were added to the reaction vessel:

| | |
|---|---|
| poly(tetramethylene oxide) glycol | 118.4g ≡ 120 meq. |
| 1,1,1,-trimethylol propane | 8.11g ≡ 180 meq. |

The mixture was then heated under vacuum to 110°C to remove any traces of water and then half the liquid charge was poured into molds and a jar. The cast charges were placed in an oven to cure at 140°C. To the remaining mixture 8.0 grams of 6% by weight triethylene diamine in benzene was added with stirring. With the mixture at 90° vacuum was applied to remove benzene and then the material was cast into molds and a jar as was the first half and placed in the oven at 140°C to cure.

The sample containing catalyst was observed to have set firm (no flow in jar test) in one hour, whereas without catalyst, setting required 3 hours. The cast materials were oven cured 19 and 18 hours respectively and were found to have the following physical properties:

| | No Catalyst | With Catalyst |
|---|---|---|
| Total cure time, hrs. | 19 | 18 |
| Hardness, Shore A | 7 | 12 |
| Tensile: | | |
| psi at failure | 237 | 289 |
| % Elongation at failure | 1657 | 1630 |
| Tear strength, lb/in | 19 | 23 |
| Compression lb/in$^2$ | 15 | 25 |

This shows the effectiveness of triethylene diamine for increasing the speed and completeness of the reactions.

Similar enhancement was observed with dibutyl tin di laurate wherein 0.655 grams dibutyl tin di laurate was added to 75 grams of the above reaction mixture (jar setting tests only).

EXAMPLE III

This is an example of an elastomer preparation using polypropylene diols and triols reacting with BAIT in the presence of stannous octoate as catalyst.

The following were weighed into a glass reaction flask fitted for heating, stirring, evacuation, nitrogen inlet and temperature measurement:

| | | |
|---|---|---|
| BAIT (isophthaloyl bis-caprolactam) | 45.1g | ≡ 250 meq. |
| Polypropylene glycol | 125.7g | ≡ 125 meq. |
| Polypropylene triol | 122.0g | ≡ 125 meq. |

The mixture was heated under vacuum to effect solution of BAIT at 135°–145°C and to remove water. Dry nitrogen was then admitted to atmospheric pressure and 1 ml. of stannous octoate (=6.1 meq.) added. The system was again closed and evacuated and the contents stirred 10 minutes while holding the temperature at 140°–145°C. The contents were then poured into hot (140°C) molds and the molds placed in an oven for curing at 140°C for 24 hours. It was noted that a small closed jar of the product had set to a nonflowing gel in 6 hours.

The product cured 24 hours had the following properties:

| | |
|---|---|
| Hardness, Shore A | 31 |
| Tensile | |
| psi failure | 122 lb/in$^2$ |
| % elongation at failure | 127 % |
| Tear Strength | 20 lb/in |
| Compression modulus at 25°C | 83 lb/in$^2$ |

What I claim is:

1. A catalyzed imide-alcohol condensation process for the preparation of polymeric compounds of polyester-polyamides comprising: contacting alcohols having one or more hydroxyl groups attached to an aliphatic carbon and acyl lactams, said contacting being in amounts of from about 10 to about 200 mole percent of the alcohol, in the presence of a catalyst selected from at least one of tertiary amines and a Group IVA, IB, IVB, VB, VIB, VII organometal compound selected from the group consisting of metal alkyls, metal phenols, metal amides, alkoxides, and glycoxides.

2. A process according to claim 1 wherein the catalyst is comprised of a Group IVA organometal compound.

3. A process according to claim 2 wherein the Group IVA metal is tin.

4. A process according to claim 1 wherein the amine is selected from the group consisting of triethylenediamine, N-ethylethylenimine, tetramethylguanidine, N-ethylmorpholine, and triethylamine.

5. A process according to claim 1 wherein the catalyzed imide-alcohol condensation occurs at a temperature of from about −20°C to about 230°C.

6. A process according to claim 1 wherein the acyl lactam is comprised of isophthaloyl bis-caprolactam and the alcohol is comprised of a polymeric polyol.

7. A process according to claim 1 wherein the acyl lactam is comprised of terephthaloyl bis-caprolactam and the alcohol is comprised of a polymeric polyol.

8. A process according to claim 6 wherein the catalyst is stannous octoate.

9. A process according to claim 6 wherein the catalyst is triethylenediamine.

10. A process according to claim 6 wherein the catalyst is dibutyl tin dilaurate.

* * * * *